United States Patent [19]

Tamada et al.

[11] Patent Number: 5,148,543
[45] Date of Patent: Sep. 15, 1992

[54] IC CARD WITH A STORED DATA CHANGE INHIBITION FUNCTION

[75] Inventors: Masuo Tamada, Yokohama; Tsutomu Tanaka, Tokyo, both of Japan

[73] Assignee: Kabushiki Kaisha Toshiba, Kawasaki, Japan

[21] Appl. No.: 321,641

[22] Filed: Mar. 9, 1989

[30] Foreign Application Priority Data

Mar. 14, 1988 [JP] Japan .................. 63-59906

[51] Int. Cl.$^5$ .............. G06F 3/02; G06F 9/06; G06F 12/14; G06F 13/16
[52] U.S. Cl. .................. 395/700; 364/238.4; 364/253.1; 364/254.4; 364/256.8; 364/260; 364/260.3; 364/268.6; 364/286.5; 364/227.3; 364/239.9; 364/DIG. 2; 235/380; 395/775
[58] Field of Search ... 364/200 MS File, 900 MS File; 395/425, 275, 700, 325, 775; 235/380

[56] References Cited

U.S. PATENT DOCUMENTS

| | | | |
|---|---|---|---|
| 4,493,031 | 1/1985 | Silverio | 364/200 |
| 4,628,479 | 12/1986 | Borg et al. | 364/900 |
| 5,016,219 | 5/1991 | Nolan et al. | 365/195 |

FOREIGN PATENT DOCUMENTS 0167044  6/1985  European Pat. Off. .

Primary Examiner—Thomas C. Lee
Assistant Examiner—Daniel H. Pan
Attorney, Agent, or Firm—Cushman, Darby & Cushman

[57] ABSTRACT

A nonvolatile memory has an area defining information area for storing area defining information corresponding to user data write areas. Each area defining information contains identification information representing whether a corresponding user data write area is an area in which stored data can be changed in accordance with a command from a keyboard. When a command for changing stored data in one of the user data write areas is supplied from the keyboard, a control element identifies in accordance with the identification information contained in the area defining information corresponding to the user data write area designated by the keyboard whether the designated user data write area is an area in which stored data can be changed. If the designated user data storage area is an area from which stored data cannot be changed, the control element inhibits stored data change processing for the designated user data write area.

19 Claims, 6 Drawing Sheets

IC CARD WITH A STORED DATA CHANGE INHIBITION FUNCTION

BACKGROUND OF THE INVENTION

1. Field of the Invention

The present invention relates to a portable electronic apparatus, known as an IC card, having a keyboard and a display unit on its surface and incorporating an erasable nonvolatile memory and a control element such as a CPU.

2. Description of the Related Art

Recently, an advanced portable data storage medium in the form of a multifunctional IC card having a keyboard and a display unit formed on its surface and incorporating an erasable nonvolatile memory such as an EEPROM and a control element such as a CPU, has been developed. Such an IC card can be used as a portable calculator, as a timepiece for displaying the time, or as a so-called electronic pocket notebook in which a variety of information can be written by using the keyboard or the display unit formed on the card surface. European Patent Disclosure No. 0167044 (published Aug. 1, 1986) discloses an IC card having a keyboard and a display unit. Alternatively, such an IC card can be inserted in an external apparatus, such as a terminal station, to exchange data therewith, and information input from such an apparatus and written in then nonvolatile memory can be changed to other information, in accordance with a command keyed-in on the keyboard.

If, however, the information input from the external apparatus and written in the memory is, for example, a trade record linked to a center system, this data change function in accordance with a keyboard command may lead to a serious problem of alteration of the record.

More specifically, specific information such as a trade record may be erroneously or intentionally changed.

SUMMARY OF THE INVENTION

It is an object of the present invention to provide a portable electronic apparatus in which specific information cannot be erroneously or intentionally changed by a keyboard command.

In order to achieve the above object of the present invention, there is provided a portable electronic apparatus comprising key input means for inputting data and commands for operating the apparatus, first memory means, divided into a plurality of data storage areas, for storing the data, second memory means for storing change identification information representing whether the data stored in each data storage area of the first memory means can be changed by the key input means, and control means for controlling the first memory means, the control means including changing means for changing, in response to a command representing data change and supplied from the key input means, the data stored in the first memory means only when the change identification information stored in the second memory means represents that the data can be changed.

DETAILED DESCRIPTION OF THE PREFERRED EMBODIMENTS

An embodiment of the present invention will now be described below, with reference to the accompanying drawings.

Figure 1:
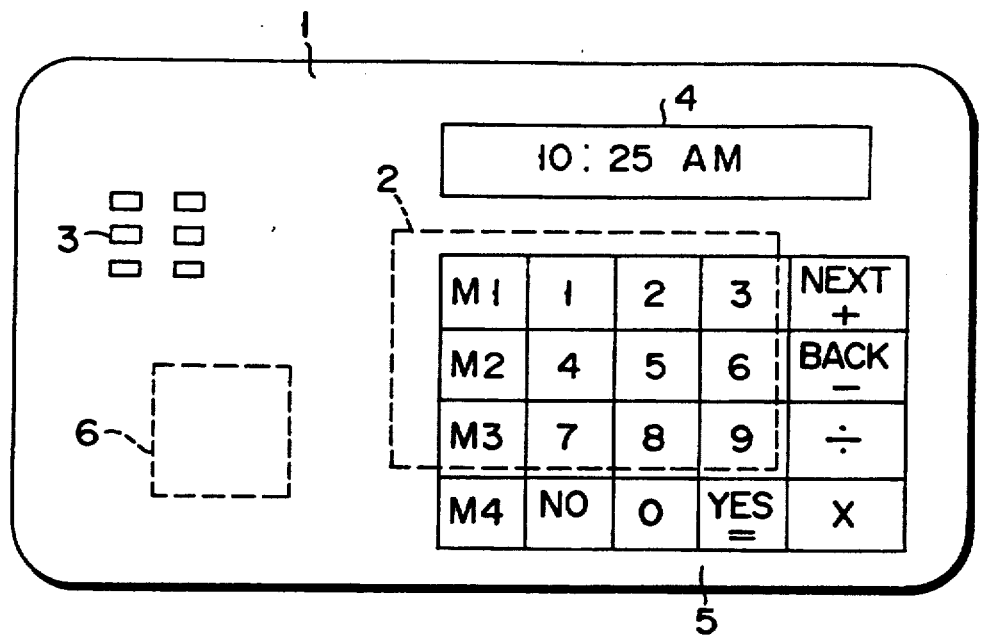
FIG. 1 is a plan view showing an arrangement of an IC card representing an embodiment of a portable electronic apparatus according to the present invention.

FIG. 1 shows an outer appearance of a portable electronic apparatus in the form of a multifunctional IC card, used, for example, as a credit card, according to an embodiment of the present invention.

Referring to FIG. 1, card main body 1 comprises a rectangular thin plastic plate in which integrated circuit (IC) 2 is embedded. Contact portion 3, electrically connected to IC 2, for electrically communicating with a terminal station (external apparatus) (not shown) in an on-line operation, is formed on the surface of main body 1, and is located at a position satisfying the standards of the card. Liquid crystal display (LCD) portion 4, for displaying input/output data, time information and the like, and keyboard 5 are also formed on the surface of main body 1. Keyboard 5 includes mode keys "M1" to "M4", ten numerical keys "0" to "9", calculation keys "+", "−", "×", and "+", and the like. Also embedded in main body 1 is a power supply battery 6.

Figure 2:
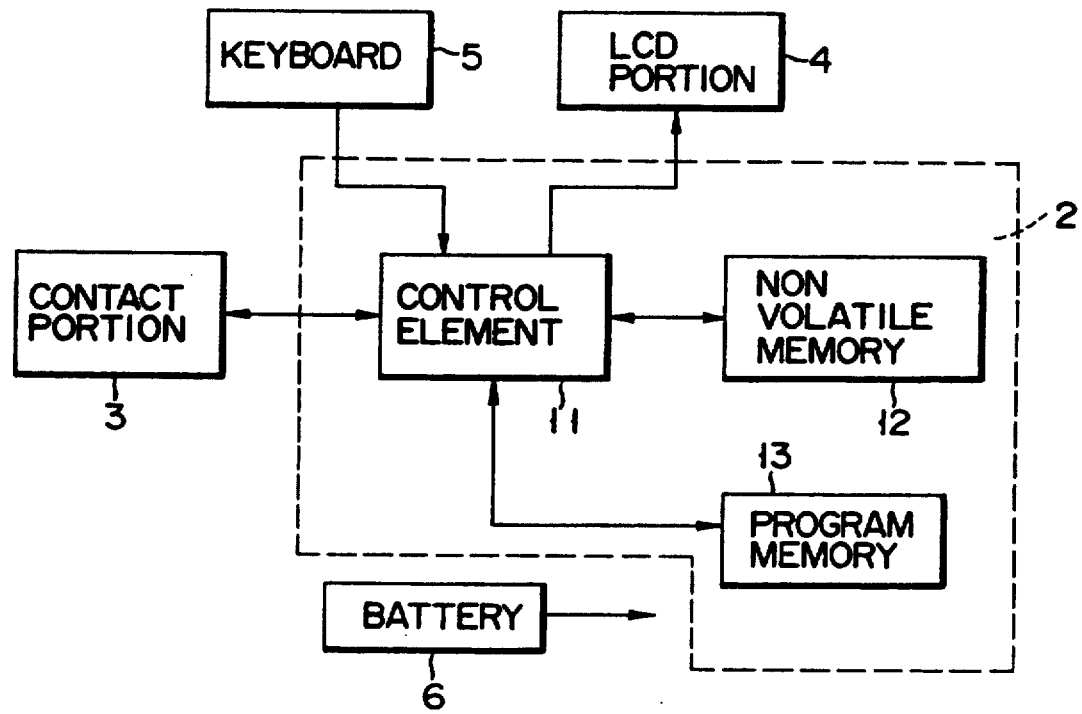
FIG. 2 is a block diagram schematically showing an arrangement of an electrical circuit of the IC card of FIG. 1.
Figures 3, 5:
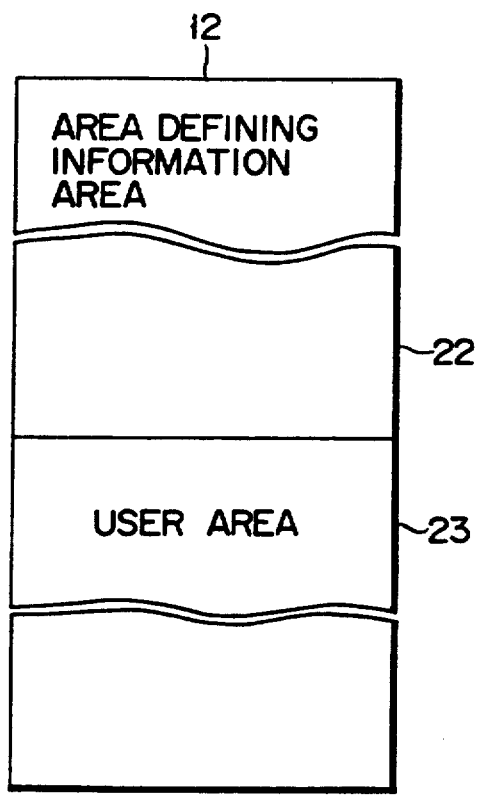
FIG. 3 is a schematic view showing a format of a nonvolatile memory of FIG. 1.
FIG. 5 is a schematic view showing a storage format of identification information.

An electrical circuit of IC 2 is arranged as is shown in FIG. 2. More precisely, IC 2 comprises control element (e.g., CPU) 11 as a control section, erasable nonvolatile memory 12, and program memory 13. IC 2 is constituted by one (or a plurality of) IC chip(s) and embedded in main body 1. Nonvolatile memory 12 in which a variety of data are arbitrarily written is constituted by, e.g., an EEPROM. As is shown in FIG. 3, memory 12 comprises area defining information area (directory area) 22 and user area 23. Program memory 13 is constituted by, for example, a mask ROM, and control programs relating to control element 11 and the like are written therein.

Figure 4:
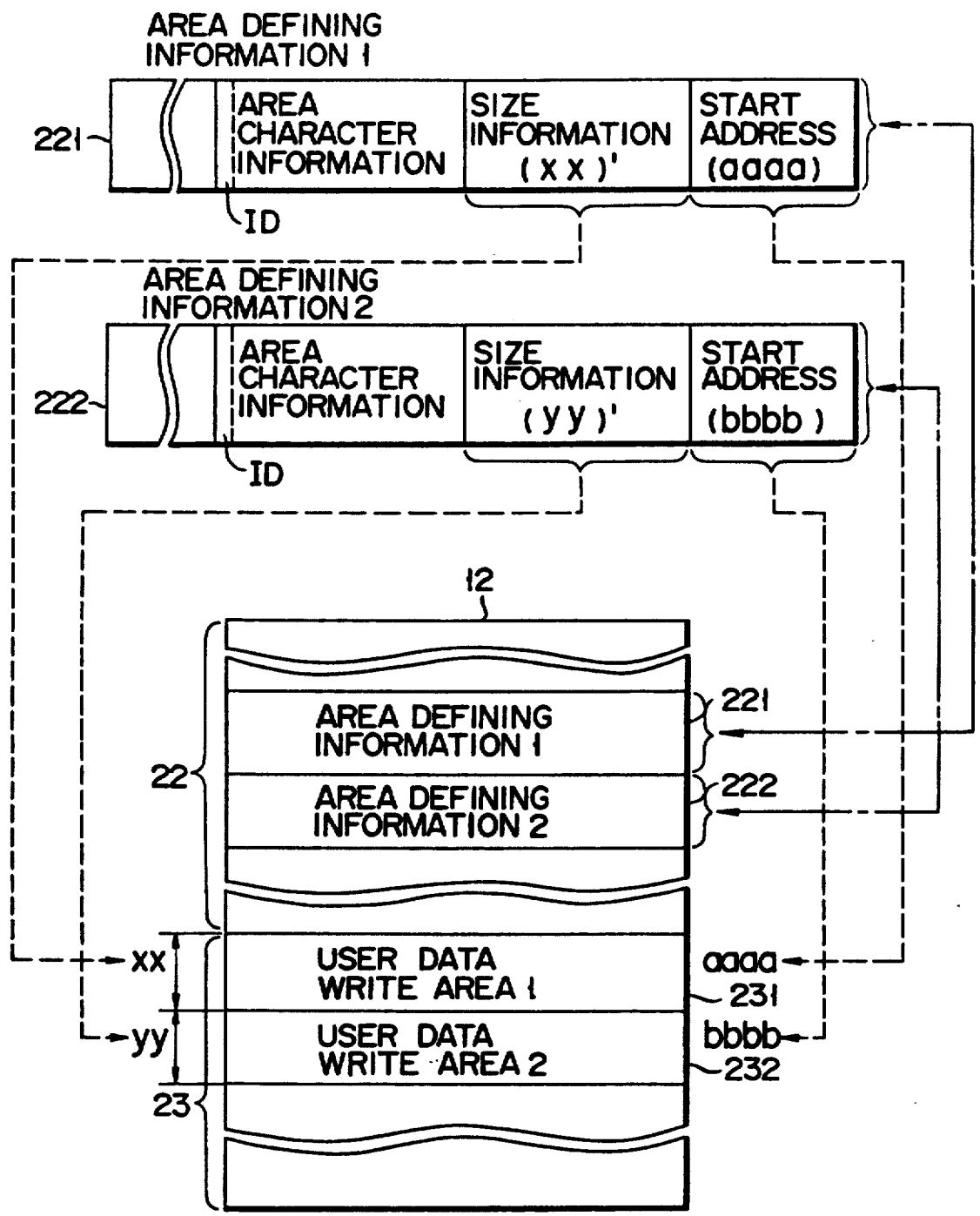
FIG. 4 is a schematic view showing a format of the nonvolatile memory of the IC card after it is issued.

As is shown in FIG. 4, a plurality of area defining information 221, 222, . . . for dividing and defining user area 23 into a plurality of user data write areas 231, 232, . . . are written in area defining information area 22 of nonvolatile memory 12. User area 23 in which a variety of data (specific information such as a trade record) are written in accordance with an application is divided and defined into a plurality of user data write areas 231, 232, ... by area defining information 221, 222, . . . Areas 231, 232, . . . can be accessed by operating mode keys "M1" to "M4" in combination with ten keys "0" to "9" on keyboard 5.

As is shown in FIG. 4, information 221, 222, . . . for defining areas 231, 232, . . . are written in area 22 in correspondence with areas 231, 232, . . . Each of information 221, 222, . . . contains area character information such as access conditions, size information, start address information and the like with respect to a corresponding one of areas 231, 232, ...

As one of the area character information, identification information (ID) is written. The identification information represents whether data written (stored in a corresponding one of areas 231, 232, ... can be changed (written) and whether the data can be read out. For example, the identification information includes four bits as is shown in FIG. 5. That is, bit "3" represents whether data can be changed from an external apparatus (reader/writer: R/W) through contact portion 3, and bit "2" represents whether data can be read out by an external apparatus (reader/writer: R/W). Bit "1" represents whether data can be changed by keyboard (KB) 5, and bit "0" represents whether data can be read out by keyboard 5. Each bit represents "NO" when "0" is written and represents "YES" when "1" is written.

For example, identification information of "0011" represents that data cannot be changed nor read out by an external apparatus but can be either changed or read out by keyboard 5. In this case, a corresponding one of user data write areas 231, 232, ... is used as, e.g., a data write portion for an electronic pocket notebook. That is, addresses, names, telephone numbers, and the like can be arbitrarily written or changed from keyboard 5, or the written information can be arbitrarily displayed on display portion 4.

Identification information of "1101" represents that data can be either changed or read out by an external apparatus but can be only read out by keyboard 5. In this case, a corresponding one of areas 231, 232 is used as, e.g., a write area for a trade record or the like. An example of such trade records is a reservation record obtained when the IC card is used in an airplane seat reservation system. That is when an airplane seat is reserved by a telephone, a reservation record including a flight number, a reserved seat number and the like of the airplane is written in a corresponding user data write area in area 23 by using a telephone line through an external apparatus such as a reader/writer. Therefore, a user can check the reservation record on display portion 5. In addition, at an airport, the reservation data can be read out from the corresponding user data write area in area 23 by an external apparatus such as a reader/writer and used in a boarding procedure for the airplane. In this case, since data changing from keyboard 5 is inhibited, the reservation record is not erroneously or intentionally changed.

Figure 6:
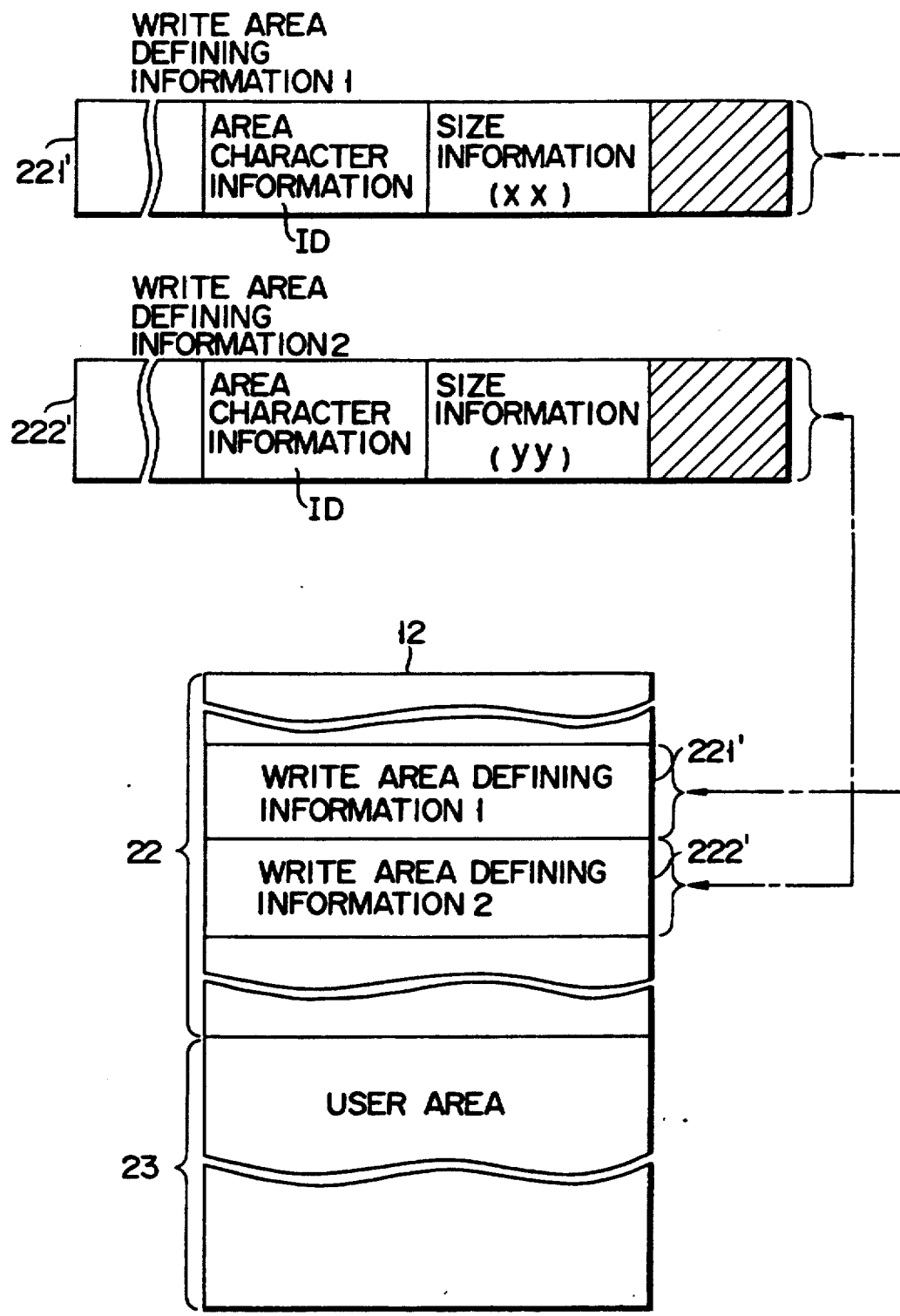
FIG. 6 is a schematic view showing a memory format of the nonvolatile memory before card issuance.

Each of area defining information 221, 222, ... containing the above identification information is arbitrarily written in accordance with an application of a corresponding one of user data write areas 231, 232, ... of user area 23 when the IC card is issued. In this case, information 221, 222, ... are written in area 22 by a system which can be easily handled by a card issuing machine (not shown) as a writing side. In addition, as is shown in FIG. 6, each of information 221, 222, ... does not contain a start address (start position information) of a corresponding one of areas 231, 232, ... to be defined. Area defining information not containing a start address (to be referred to as write area defining information hereinafter) 221', 222', ... are written at the same locations as areas defining information 221, 222, ... to be actually used when a card operation is enabled. In order to generate and add information not present in information 221', 222', ... to information 221', 222', ..., information 221, 222, ... are larger than information 221', 222', ... by an amount of the additional information when the card operation is enabled. Since large information 221, 222, ... are written when the card operation is enabled, portions not having data (two-byte empty data such as hatched portions in FIG. 6) are formed. These portions are kept unchanged until information 221, 222, ... are stored as will be described later.

Referring to FIG. 6, two write area defining information 221' and 222' are written. In order to write information 221' and 222', IC card main body 1 is inserted in a cord insertion port of a card issuing machine (not shown), and defining information (area character information such as access conditions including identification information, and area size information) is input from a keyboard or the like of the card issuing machine. That is, the card issuing machine transmits the input defining information to control element 11 of the IC card. Control element 11 receives the information and writes it in area defining information area 22 of memory 12. In information 221' and 222' written as described above, size information (xx, yy) represent sizes which a user can actually use. Since a user data write area of user area 23 is not allocated yet, neither of information 221' and 222' has start address information.

When control element 11 receives an issuing command for storing area defining information 221 and 222 from the card issuing machine after write area defining information 221' and 222' are written, it rearranges information 221' and 222' written in area defining information area 22 into a format which can be easily controlled as is shown in FIG. 4 (e.g., size information xx' and yy' each obtained by adding control data used upon data control to a size which a user can actually use are used as size information in corresponding user data write areas 231 and 232, respectively). Control element 11 then allocates areas 231 and 232 in user area 23 on the basis of the above size information. After control element 11 correctly allocates area 231 and 232, it calculates start addresses (aaaa, bbbb) of areas 231 and 232 to be defined. Control element 11 than adds the calculated start addresses to write area defining information 221' and 222' in area 22, thereby storing area defining information 221 and 222 having a format to be used when the card operation is enabled. Arranged information 221 and 222 to be actually used when the card operation is enabled are rewritten (overwritten) in the same locations as information 221' and 222'. In this manner, area defining, i.e., IC card issuance is completed.

Figure 7A:
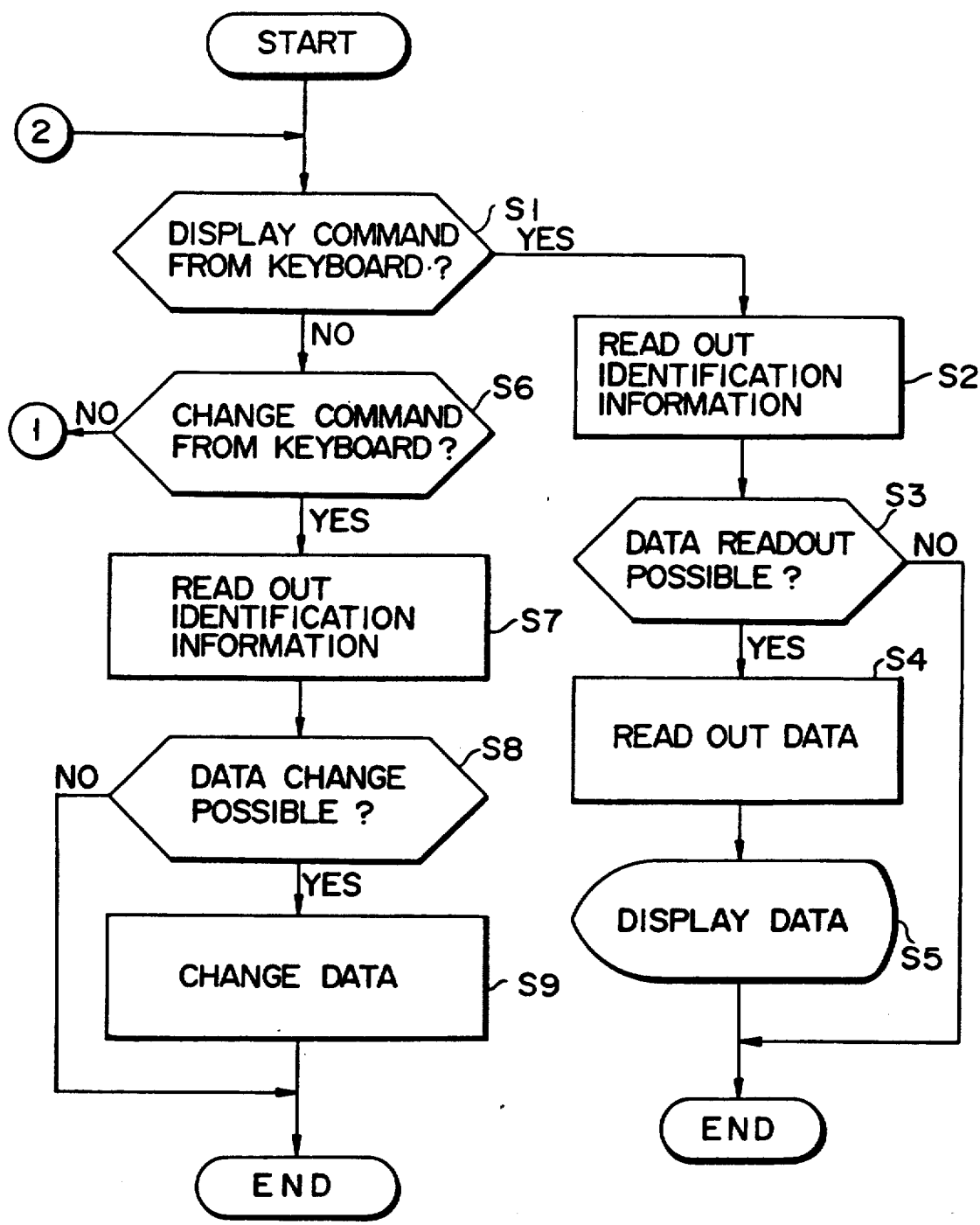
FIGS. 7A and 7B are flowcharts for explaining the operation of the apparatus of the present invention.
Figure 7B:
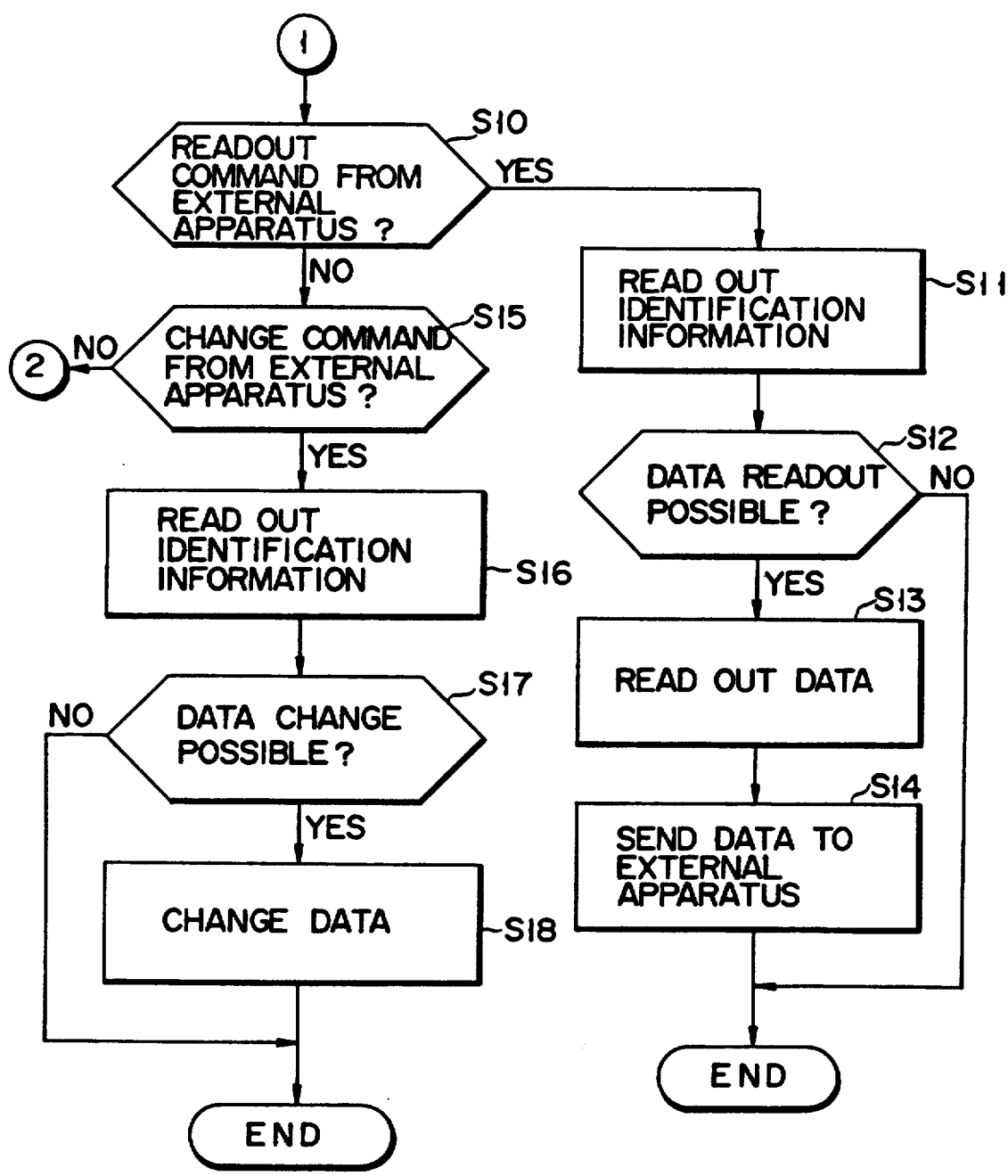

An operation of the apparatus having the above arrangement will be described below with reference to flowcharts in FIGS. 7A and 7B. If, for example, a command for displaying specific data written in a certain user data write area, e.g., user data write area 231 is input by operating mode keys "M1" to "M4" in combination with ten keys "0" to "9" on keyboard 5 of main body 1 (step S1), control element 11 reads out identification information in area defining information 221 corresponding to area 231 from area defining information area 22 (step S2). Control element 11 then checks whether "1" is written in bit "0" contained in the read-out identification information and representing whether the designated data can be read out by keyboard 5, thereby checking whether the data can be read out (step S3). If "0" is written in the bit, control element 11 determines that the data cannot be read out and therefore inhibits readout of the data from area 231 and ends the processing. If "1" is written in the bit, control element 11 determines that the designated specific data can be read out and therefore reads out the data from area 231

(step S4). The readout data is displayed on display portion 4 (step S5). When the data is determined not to be read out, control element 11 may display this determination result on display portion 4 in addition to inhibition of data readout from area 231.

If a command for changing data written in user data write area 231 is input by operating mode keys "M1" to "M4" in combination with ten keys "0" to "9" on keyboard 5 of main body 1 (step S6), control element 11 reads out identification information in area defining information 221 corresponding to area 231 from area defining information area 22 (step S7). Control element 11 then checks whether "1" is written in bit "1" contained in the readout identification information and representing whether the data can be changed by keyboard 5, thereby checking whether the data can be changed (step S8). If "0" is written in the bit, control element 11 determines that the data cannot be changed and therefore inhibits data changing in area 231 and ends the processing. If "1" is written in the bit, control element 11 determines that the data can be changed and therefore executes data changed processing in area 231 (step S9). When the data is determined not to be changed, control element 11 may display this determination result on display portion 4 in addition to inhibition of data changing in area 231.

If a command for reading out data written in user data write area 231 is input from a reader/writer of a terminal station as an external apparatus through contact portion 3 (step S10), control element 11 reads out identification information in area defining information 221 corresponding to area 231 from area defining information area 22 (step S11). Control element 11 then checks whether "1" is written in bit "2" contained in the readout identification information and representing whether the data can be read out by an external apparatus, thereby checking whether the data can be read out (step S12). If "0" is written in the bit, control element 11 determines that the data cannot be read out and therefore inhibits data readout from area 231 and ends the processing. If "1" is written in the bit, control element 11 determines that the data can be read out and therefore reads out the designated data from area 231 (step S13). The readout data is output to the reader/writer through contact portion 3 (step S14). When the data is determined not to be read out, control element 11 may output this determination result to the reader/writer through contact portion 3 in addition to inhibition of data readout from area 231.

If a command for changing data written in user data write area 231 is input from the reader/writer through contact portion 3 (step S15), control element 11 reads out identification information in area defining information 221 corresponding to area 231 from area defining information area 22 (step S16). Control element 11 then checks whether "1" is written in bit "3" contained in the readout identification information and representing whether the data can be changed, thereby checking whether the data can be changed (step S17). If "0" is written in the bit, control element 11 determines that the data cannot be changed and therefore inhibits data changing in area 231 and ends the processing. If "1" is written in the bit, control element 11 determines that the data can be changed and therefore executes data change processing in designated area 231 (step S18). When the data is determined not to be changed, control element 11 may output this determination result to the reader/writer through contact portion 3 in addition to inhibition of the change processing in area 231.

As described above, in order to change the contents in nonvolatile memory 12 by keyboard 5, control element 11 checks in accordance with identification information whether the data to be changed can be changed by keyboard 5. In this manner, data is changed only when it is determined changeable. Therefore, important specific information such as a settlement record or airplane seat reservation record written in memory 12 by an external apparatus cannot be altered by keyboard 5. As a result, the safety of data is significantly improved as compared with that of a conventional apparatus.

That is, according to the present invention, specific information stored in a memory of a portable electronic apparatus is not erroneously or intentionally changed by a keyboard of the apparatus.

The present invention is not limited to the above embodiment but can be variously modified. For example, in the above embodiment, the identification information comprises 4-bit data. This information, however, may comprise a 1-bit flag representing only whether data can be changed by keyboard 5.

What is claimed is:

1. An IC card removeably connectable to an external device for receiving/transmitting data, the IC card comprising:

an IC card body having a surface;

key input means, provided on the IC card body surface, for inputting data, a data reading command and a data writing command in response to user key input operations;

contact means provided on the IC card body surface for connecting the IC card to an external device for receiving data therefrom;

memory means for storing the received data, the memory means having a storage area divided into a plurality of data storage areas each for storing data corresponding to a desired object and an identification information storage area for storing a first identification information representing whether data stored in a corresponding one of the data storage areas can be read and for storing a second identification information representing whether data can be written into the memory means;

identifying means for identifying in accordance with the first identification information whether reading of data from one of the data storage areas corresponding to a desired object is possibly when a data reading command is input from the key input means, and for identifying in accordance with the second identification information whether writing of data to one of the data storage areas corresponding to a desired object is possible when a data writing command is input from the key input means;

data writing means for writing the received data into the data storage areas of the memory means and for writing data, in accordance with an input from the key input means, into a data storage area corresponding to a desired object when the identifying means identifies that writing of data to the data storage area corresponding to the desired object is possible;

data reading means for reading data from the one of the data storage areas corresponding to a desired object when the identifying means identifies that reading of data from the one of the data storage areas corresponding to the desired object is possible;

display means formed on the IC card body surface for displaying the data read by the data reading means; and read out inhibition means for inhibiting reading of data from the one of the data storage areas corresponding to the desired object when the identifying means identifies that reading of data from the one of the data storage areas corresponding to the desired object is not possible.

2. An IC card according to claim 1, wherein the contact means further receives a data writing command from the external device;

the identifying means identifies in accordance with the second identification information whether writing of data to one of the data storage areas corresponding to a desired object is possible when a data writing command is received from the external device;

the data writing means writes the received data into a data storage area corresponding to a desired object when the identifying means identifies that writing of data from the external device to the data storage area corresponding to the desired object is possible; and a data write inhibiting means inhibits writing of data to the one of the data storage areas when the identifying means identifies that writing of data from the external device to the data storage area corresponding to the desired object is not possible.

3. An IC card according to claim 2, wherein the contact means further receives a data reading command from the external device; and the identifying means identifies in accordance with the first identification information whether reading of data from one of the data storage areas corresponding to a desired object is possible when a data reading command is received from the external device.

4. An IC card according to claim 2, wherein the second identification information comprises 2-bit data in which one bit indicates whether data can be written into the memory means in accordance with a data writing command from the key input means and one bit indicates whether data can be written into the memory means in accordance with a data writing command from the external device, and the first identification information comprises 1-bit data indicating whether stored data can be read in accordance with a data reading command from the key input means.

5. An IC card according to claim 3, wherein the first identification information comprises 2-bit data in which one bit indicates whether stored data can be read in accordance with a command from the key input means and one bit indicates whether stored data can be read in accordance with a command from the external device.

6. An IC card according to claim 1, wherein the contact means further receives a data reading command from the external device; and the identifying means identifies in accordance with the first identification information whether reading of data from one of the data storage areas corresponding to a desired object is possible when a data reading command is received from the external device.

7. An IC card according to claim 6, wherein the first identification information comprises 2-bit data in which one bit indicates whether stored data can be read in accordance with a command from the key input means and one bit indicates whether stored data can be read in accordance with a command from the external device.

8. An IC card according to claim 1, wherein when the memory means is divided into the data storage areas, the data writing means arbitrarily writes each of the first and second identification information in the identification information storage area in accordance with a desired object of a corresponding one of the data storage areas.

9. An IC card according to claim 1, wherein each of the first and second identification information is represented by 1-bit data.

10. An IC card according to claim 1, wherein the first and second identification information are written into the IC card by means of an IC card issuing machine.

11. An IC card according to claim 1, further comprising a data write inhibiting means for inhibiting writing of data to the one of the data storage areas corresponding to a desired object when the identifying means identifies that writing of data to the data storage area corresponding to the desired object is not possible.

12. An IC card according to claim 1, wherein the received data is seat reservation data and a write inhibiting means inhibits writing of seat reservation data into the memory means in accordance with the second identification information.

13. An IC card removeably connectable to an external device for receiving/transmitting data, the IC card comprising:

an IC card body having a surface;

key input means, provided on the IC card body surface, for inputting data, a data reading command and a data writing command in response to user key input operations;

a contact portion formed on the IC card body surface for connecting the IC card to an the external device for receiving data and a data writing command therefrom;

first memory means for storing the received data, the first memory means divided into a plurality of data storage areas each for storing data corresponding to a desired object;

second memory means for, in accordance with the data storage areas, storing first identification information representing whether data stored in the data storage areas can be read in response to a data reading command from the key input means, second identification information representing whether data writing can be performed in response to a data writing command from the key input means, and third identification information representing whether data writing can be performed in response to a data writing command from the external device;

first identifying means for identifying in accordance with the first identification information whether reading of data from a desired one of the data storage areas is possible when a data reading command for reading out the data stored in the desired one of the data storage areas is input from the key input means;

second identifying means for identifying in accordance with the second identification information whether writing of data to a desired one of the data storage areas is possible when a data writing command for writing into a desired one of the data storage areas is input from the key input means;

third identifying means for identifying in accordance with the third identification information whether writing of data to a desired one of the data storage areas is possible when a data writing command for writing into a desired one of the data storage areas is input from the external device;

first data writing means for writing data into a desired one of the data storage areas in accordance with a data write command from the key input means when it is identified by the second identifying means that writing of data to the desired one of the data storage areas is possible;

second data writing means for writing the received data into a desired one of the data storage areas in accordance with a data write command from the external device when it is identified by the third identifying means that writing of data to the desired one of the data storage areas is possible;

data reading means for reading data stored in a desired one of the data storage areas when the first identifying means identifies that reading of data from the desired one of the data storage areas is possible;

display means formed on the IC card body surface for displaying the data read out by the data reading means; and read out inhibition means for inhibiting reading of data from the desired one of the data storage areas when the first identifying means identifies that reading of data from the desired one of the data storage areas is not possible.

14. An IC card according to claim 13, wherein:

the contact portion further receives from and external device, operating data and an operating command to operate the IC card; and fourth memory means for storing write identification information representing whether the received operating data can be stored in the first memory means, and wherein the second data writing means further includes operating write means for writing, in response to an operating command from the external device, the received operating data in the first memory means only when the write identification information stored in the fourth memory means represents that the operating data can be stored.

15. An IC card according to claim 13, further comprising:

third memory means for storing display identification information representing whether the data stored in each data storage area of said first memory means can be displayed by said display means, and wherein said data reading means further includes readout means for supplying to the display means, in response to a display data command from the key input means, data stored in a storage area only when the display identification information stored in the third memory means represents that the data stored in the storage area can be displayed.

16. An IC card according to claim 13, wherein the contact portion further receives a data reading command from an external device; and the second memory means further includes fourth identification information representing whether data stored in the data storage areas can be read in response to a data reading command from the external device.

17. An IC card according to claim 13, further comprising a data write inhibiting means for inhibiting writing of data to a desired one of the data storage areas when one of the second and third identifying means identifies that writing of data to the desired one of the data storage areas is not possible.

18. An IC card according to claim 13, wherein the first, second and third identification information is written into the IC card by means of an IC card issuing machine.

19. An IC card according to claim 13, wherein the received data is seat reservation data and a write inhibiting means inhibits writing of seat reservation data into the first memory means in accordance with the second and third identification information.

* * * * *